United States Patent [19]

Hasebe et al.

[11] Patent Number: 5,718,302
[45] Date of Patent: Feb. 17, 1998

[54] HYDRAULIC CIRCUIT FOR ELECTRIC CAR DRIVE TRAIN

[75] Inventors: Masahiro Hasebe, Anjo; Yoshio Kinto, Okazaki; Masayuki Takenaka, Nishio, all of Japan

[73] Assignee: Aisin AW Co., Ltd., Japan

[21] Appl. No.: 534,465

[22] Filed: Sep. 27, 1995

[30] Foreign Application Priority Data

Sep. 27, 1994 [JP] Japan ............ 6-256115
Oct. 31, 1994 [JP] Japan ............ 6-288625

[51] Int. Cl.$^6$ .................................... B60K 1/02
[52] U.S. Cl. .................... 180/65.6; 180/60; 310/54; 310/63
[58] Field of Search ............ 180/65.6, 60; 310/52, 310/58, 54, 63, 60 R

[56] References Cited

U.S. PATENT DOCUMENTS

| | | | |
|---|---|---|---|
| 4,223,569 | 9/1980 | Koivunen et al. | |
| 4,418,777 | 12/1983 | Stockton | 180/65 |
| 5,111,090 | 5/1992 | Otake et al. | 310/54 |
| 5,127,485 | 7/1992 | Wakuta et al. | 180/65.5 |
| 5,372,213 | 12/1994 | Hasebe et al. | 180/65.6 |
| 5,517,072 | 5/1996 | Hildebrandt | 310/228 |

FOREIGN PATENT DOCUMENTS 698417  4/1994  Japan.

Primary Examiner—Brian L. Johnson
Assistant Examiner—Avraham Lerner
Attorney, Agent, or Firm—Lorusso & Loud

[57] ABSTRACT

A hydraulic circuit for an electric car drive train including a motor, a torque transmission device for transmitting the output torque of the motor to drive wheels, an oil pump for feeding the oil from an oil reservoir, a drive device for rotationally driving the oil pump and a discharge circuit for receiving oil discharged from the oil pump. A lubrication circuit connects to the discharge circuit, through a first throttle, to the torque transmission device. A cooling circuit connects to the discharge circuit through a second throttle and guides the flow of oil to the motor. A valve arranged between the discharge circuit, upstream of the first throttle, and the cooling circuit feeds the oil from the discharge circuit to the cooling circuit when the oil pressure of the discharge circuit exceeds a predetermined level. The oil flow fed to the lubrication circuit is kept constant even at a high speed rotation by the regulating action of the valve so that the oil flow feed to the cooling circuit increases with rise in rate of the motor speed.

10 Claims, 14 Drawing Sheets

HYDRAULIC CIRCUIT FOR ELECTRIC CAR DRIVE TRAIN

BACKGROUND OF THE INVENTION

1. Field of the Invention

The present invention relates to a drive train for use in an electric car and, more particularly, to a hydraulic circuit for lubricating/cooling the drive train.

2. Related Art

One type of prior art drive train for an electric car combines a motor and torque transmission means for transmitting the output torque of the motor to drive wheels. The electric car drive train of this type is equipped with a lubricating/cooling oil circuit for lubricating the individual portions of the torque transmission means and for cooling the motor at intermediate and high speeds. U.S. Pat. No. 4,418,777 discloses a lubricating/cooling circuit of this type wherein oil is distributed at a predetermined ratio to (1) a lubrication circuit for lubricating the individual components of the torque transmission by feeding the oil discharged from an electric oil pump to a support portion via an oil passage in the case wall and (2) a cooling circuit for cooling the coil of the motor.

An example of a cooling circuit for the motor coil is disclosed in Japanese Patent Laid-Open No. 98417/1994. The disclosed cooling circuit cools the motor by feeding the discharge from an oil pump to an annular oil chamber, provided in a jacket on the upper side of the drive train case which houses the motor, and by feeding oil to the coil end portion of the motor through an ejection port which is formed in the inner circumferential wall of the annular oil chamber.

In the above-described electric car drive train, the lubricating oil flow is maintained in a range which is preferred from the viewpoint of minimizing any increase in the resistance to the rotation, which is caused by agitation of the oil. On the other hand, the cooling oil flow should increase with an increase in the rate heat is generated by the motor. In the hydraulic circuit thus constructed, however, if the discharge of oil from the oil pump increases, the oil flows fed to the lubrication circuit and to the cooling circuit accordingly increase. If the discharge of oil from the oil pump increases in accordance with the cooling demand of the motor, not only the oil flow for cooling the motor but also the oil flow for lubricating the torque transmission is increased so that an excessive amount of oil is fed to the lubrication circuit. The driving force expended in discharging excess oil represents a drive loss for the oil pump.

In the cooling device of the prior art, moreover, the ejection port is formed by drilling from the interior of the case into the annular oil chamber. Due to the restricted working space the ejection port tends to be formed with its axis inclined with respect to the axis of the case so that the resultant oblique hole cannot be formed with a desirably small diameter. As a result, when oil is fed to the ejection port it is not strongly ejected and a portion runs down the inner circumferential wall of the case. As a result, a significant amount of the oil recovered and recirculated never comes into contact with the coil end of the motor and, therefore, the motor coil cannot be efficiently cooled.

Because of the difficulty in forming a small diameter ejection port, moreover, the pressure drop in the cooling oil passage is such that a significantly greater amount of oil is ejected from an upstream ejection port than from a downstream ejection port. This difference creates another problem in that, because the ejection oil flows from the individual ejection ports are not uniform, there is an imbalance in cooling performance.

SUMMARY OF THE INVENTION

It is, therefore, an object of the present invention to provide a hydraulic circuit for an electric car drive train, which is able to cool the motor efficiently while reducing the drive loss of the oil pump, by increasing only the flow of cooling oil to the motor with an increase in the discharge of oil from the oil pump, thereby eliminating any excessive lubricating oil flow.

The second object of the present invention to provide a hydraulic circuit for an electric car drive train, which is equipped with a motor cooling circuit capable of cooling the motor coil without fail even with a low rate of discharge from the oil pump.

A third object of the present invention is to provide for uniformity of discharge oil flows from the individual ejection ports of the aforementioned cooling circuit.

In order to achieve the first stated objective, the present invention provides a hydraulic circuit for an electric car drive train, comprising: a motor; torque transmission means for transmitting the output torque of the motor to drive wheels; an oil pump for feeding oil from an oil reservoir; drive means for rotationally driving the oil pump; an oil distribution circuit for receiving the oil discharged from the oil pump; a lubrication circuit which receives oil from the oil distribution circuit through a first throttle means for feeding the oil to the torque transmission means; a cooling circuit which receives oil from the oil distribution circuit through second throttle means for feeding oil to the motor; and a valve arranged between the oil distribution circuit, upstream of the first throttle means, and the cooling circuit for feeding the oil from the oil distribution circuit to the cooling circuit when the oil pressure in the oil distribution circuit exceeds a predetermined value, thus by-passing the second throttle means. The drive means for the oil pump can, for example, utilize the output torque of the motor.

In order to achieve the aforementioned second and third objectives, the present invention provides a hydraulic circuit for an electric car driving system, including a motor. The motor includes a cylindrical core fixed to the interior surface of a case and formed with a plurality of slots in its inner circumferential surface, a stator having a coil mounted in the slots of the core with a coil end extending beyond an end face of the core, and a rotor arranged radially inside of the stator and rotatably supported in the case. Torque transmission means transmits the output torque of the motor to drive wheels and an oil pump is provided for feeding oil from an oil reservoir for cooling and lubricating, along with drive means for rotationally driving the oil pump. A cooling circuit feeds the oil discharged from the oil pump to the motor and includes an oil feed passage for feeding the oil discharged from the oil pump to above the motor. A cooling oil ejection unit has an ejection face, and an ejection port formed in the ejection face for ejecting the oil received from the oil feed passage, the ejection face being spaced from the adjacent inner circumferential wall of the case and positioned over the coil end. The cooling oil ejection unit may have a plurality of ejection faces, each formed with a plurality of ejection ports. Each ejection face may have an end portion sloped downward from the ejection port and positioned above the coil end.

In one preferred embodiment the cooling circuit serves to cool first and second coil ends and includes first and second cooling oil ejection units arranged, respectively, over the first and second coil ends and having a plurality of first oil passages for providing communication of a plurality of ejection ports. A second oil passage connects the first oil passages of each ejection unit and a third oil passage connects the second oil passage of the first cooling oil ejection unit with the second oil passage of the second cooling oil ejection unit. A feed oil passage connects one of the first oil passages of the first cooling oil ejection unit to the oil discharge of the oil pump.

In another preferred embodiment the cooling circuit serves to cool first and second coil ends and includes a first cooling oil ejection unit arranged over the first coil end and having a plurality of first oil passages leading to respective oil ejection ports and a second cooling oil ejection unit arranged over the second coil end and likewise having a plurality of first oil passages leading to respective oil ejection ports, and a second oil passage connecting the first oil passages. A plurality of third oil passages serve to connect one of the first oil passages of the first cooling oil ejection unit and the second oil passage of the second cooling oil ejection unit and an oil feed passage connects one of the first oil passages of the first cooling oil ejection unit to the oil discharge of the oil pump.

In yet another embodiment, the cooling circuit includes first and second cooling oil ejection members in axial contact with the case and arranged over the first and second coil ends. Each ejection member has a groove formed along its face contacting the case, a plurality of ejection ports and a plurality of ejection oil passages connecting the ejection ports with the groove. An axially extending oil passage is formed in the wall of the case above the core and serves to connect the groove of the first cooling oil ejection member and the groove of the second cooling oil ejection member. An oil feed passage connects one of the ejection oil passages of the first cooling oil ejection member to the oil discharge of the oil pump.

Yet another embodiment is like the embodiment described immediately above, except that a plurality of axially extending oil passages are formed in the wall of the case above the core and serve to connect one of the ejection oil passages of the first cooling oil ejection member with the groove of the second cooling oil ejection member. As in the embodiment described immediately above, an oil feed passage connects one of the ejection oil passages of the first cooling oil ejection member to the oil discharge of the oil pump.

In the hydraulic circuit of the present invention, regardless of whether the discharge oil flow of the oil pump is sufficient or insufficient for ejection of a spray, the lubricating oil is fed by the pump to the torque transmission means by way of the discharge circuit, the first throttle means and the lubrication circuit and the cooling oil is fed by the pump through the discharge circuit and the second throttle means to the cooling circuit. A diversion valve is provided between the discharge circuit and the cooling oil circuit, which valve opens responsive to the oil pressure of the discharge circuit exceeding a predetermined level, so that the excess oil in the discharge circuit is diverted to the cooling circuit.

Thus, according to the hydraulic circuit of the present invention, when the oil pressure of the discharge circuit exceeds the predetermined level, a diversion valve opens to feed the excess oil from the discharge circuit to the cooling circuit so that the oil pressure of the discharge circuit is held at a constant level, independently of the oil discharge rate of the oil pump, to feed oil at a constant flow rate from the lubrication circuit to the torque transmission means through the first throttle means. On the other hand, the oil fed to the cooling circuit includes any excess oil diverted from the lubrication circuit. As the heat generated by the motor increases, the cooling oil to the motor, as required, can be supplemented by the excess oil from the discharge circuit. As a result, no more oil than necessary need be fed to the torque transmission means, so that drive loss of the oil pump can be accordingly reduced. Moreover, the cooling oil flow to the motor can be increased beyond any increase in discharge from the oil pump by diverting excess lubricating oil to the cooling of the motor. As a result, it is possible to retain reliable oil flows for cooling the motor and lubricating the torque transmission means.

The drive means for rotationally driving the oil pump may be a second torque transmission means which transmits the output torque of the motor to the oil pump, thereby simplifying the construction of the electric car drive train. Because the running resistance of the vehicle increases with an increase in the vehicle speed, the vehicle's electric motor must generate a higher output for the higher vehicle speed and thereby generates a higher average amount of heat for the higher vehicle speed. By rotationally driving the oil pump with the motor, as described above, the rate of discharge of the oil pump is increased with an increase in the vehicle speed so that the motor cooling oil flow can accordingly increase with the increase in the vehicle speed to maintain efficient cooling.

On the other hand, when the motor is driven as a generator, as in regenerative braking, the oil pump can be rotationally driven without any consumption of electric power, thereby maintaining the lubricating oil flow to the torque transmission means and the cooling oil flow to the motor.

With the oil flow discharge rate from the oil pump sufficient for vigorous ejection (forming a spray), the oil vigorously ejected from the ejection port or ports formed in the ejection face of the cooling oil ejection unit is fed directly onto the coil end or ends. However, when the discharge flow rate is insufficient for proper formation of a spray, the "ejected" oil flows down along the ejection face of the cooling oil ejection unit. Since, however, the end portion of the ejection face is spaced from the inner wall of the case and positioned above the coil end, the oil falls as droplets from the lower end portion of the ejection face onto the coil end. As a result, the oil can be fed without fail to the coil end, even if the discharge of the oil pump is insufficient for "vigorous" ejection or proper spray formation.

In a preferred embodiment, the cooling oil ejection unit is provided with a plurality of ejection faces, each ejection face having a plurality of ejection ports so that it can uniformly eject the oil all over the coil end. In this embodiment, when the discharge oil flow of the oil pump is insufficient for vigorous ejection, the oil flowing out of the ejection port(s) is collected on a sloped extension of the ejection face and fed to the coil end while being prevented from dispersion by the ejection face extension.

In another embodiment, the oil discharged from the oil pump is fed to one of the first oil passages of the first cooling oil ejection unit so that it is ejected from the ejection ports to the first coil end. Then, the excess oil is fed in part to the remaining first oil passages via the second oil passage of the first cooling oil ejection unit so that it is ejected onto the first coil end from the ejection ports, and in part to the second oil passage of the second cooling oil ejection unit and to the first oil passages via the third oil passage for ejection onto the second coil end from the ejection ports. Thus, the oil is ejected at the low rate from the first cooling oil ejection unit, and the remaining oil is fed to the second cooling oil ejection unit and the second cooling oil ejection unit so that the oil can be fed without fail to the ejection ports of the first and second cooling oil ejection units.

In yet another embodiment, the oil discharged from the oil pump is fed to one of the first oil passages of the first cooling oil ejection unit so that it is ejected onto the first coil end, with the remainder of the oil being fed via one of the third oil passages to the second oil passage of the second cooling oil ejection unit and to its first oil passages for ejection onto the second coil end. The remainder of the oil received from the second cooling oil ejection unit is fed via the remaining third oil passages to the ejection oil passages of the first cooling oil ejection unit for ejection onto the first coil end. Thus, the oil is ejected at a low rate by the first cooling oil ejection unit and then fed to the second cooling oil ejection unit, and, finally, the remaining oil is fed back to the first cooling oil ejection unit. As a result, the oil is fed to the first and second cooling oil ejection units so that it can be uniformly ejected from those ejection ports.

The ejection ports are preferably formed in the cooling oil ejection member which is separate from the case, so that the boring of same is more simple and easier than the boring of ejection ports directly into the inner wall of the case. As a result, the diameter and number of the ejection ports can be optimized to uniformly balance the flows through the various the ejection ports.

DESCRIPTION OF THE PREFERRED EMBODIMENTS

Figure 1:
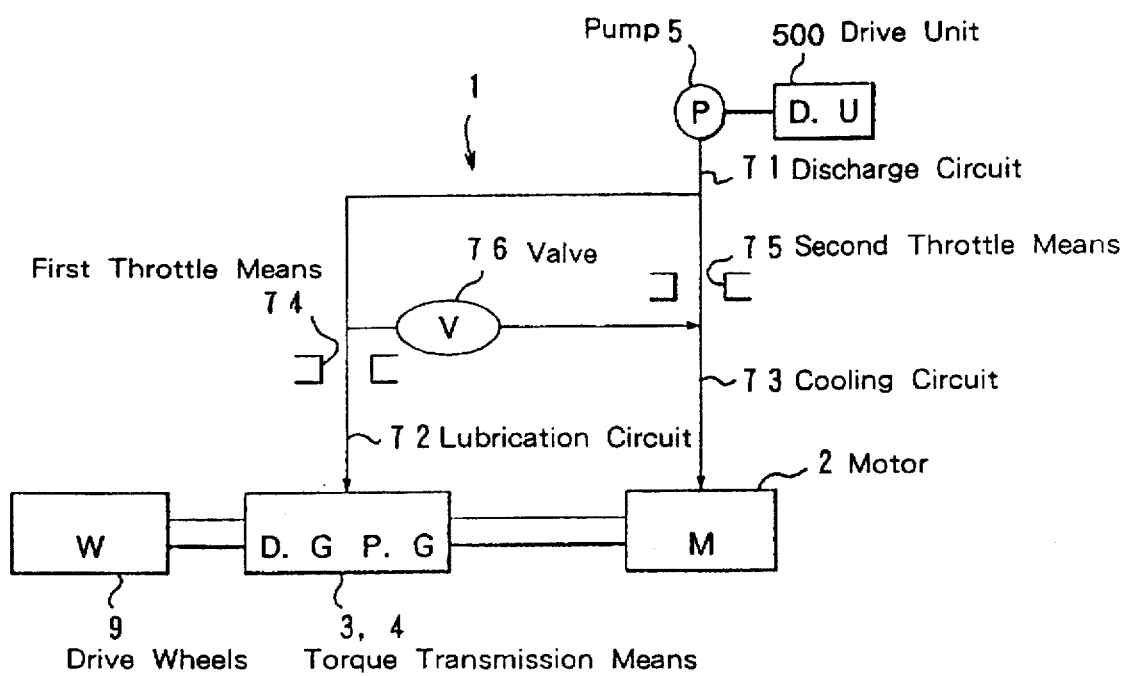
FIG. 1 is a block diagram showing overall construction of an electric car drive train equipped with a hydraulic circuit of the present invention.

Various embodiments of the present invention will now be described with reference to the accompanying drawings. FIG. 1 shows an electric car drive train 1 including: a motor 2; a torque transmission 3 and 4 for transmitting the output torque of the motor 2 to drive wheels 9; an oil pump 5; a drive unit 500 for rotationally driving the oil pump 5; a oil distribution circuit 71 for receiving the oil discharged from the oil pump 5; a lubrication circuit 72 connected to the oil distribution circuit 71 through first throttle means 74 for feeding oil to the torque transmission means 3 and 4; a cooling circuit 73 connected to the oil distribution circuit 71 through second throttle means 75 for feeding oil to the motor 2; and a valve for feeding oil from the oil distribution circuit 71 to the cooling circuit 73 when the oil pressure of the oil distribution circuit exceeds a predetermined value.

With the drive unit 500, as shown, the oil pump 5 is rotationally driven by the motor 2 through torque transmission means 24, 25 and 51 to 53. Alternatively, the drive unit 500 may be additionally equipped with an oil pump 5 driving motor and a motor controller for controlling the motor to increase the discharge rate of the oil pump 5 responsive to (1) an increase in the torque command, (2) an increase in the vehicle speed, (3) a high motor coil temperature and (4) a high temperature of the oil.

Figure 2:
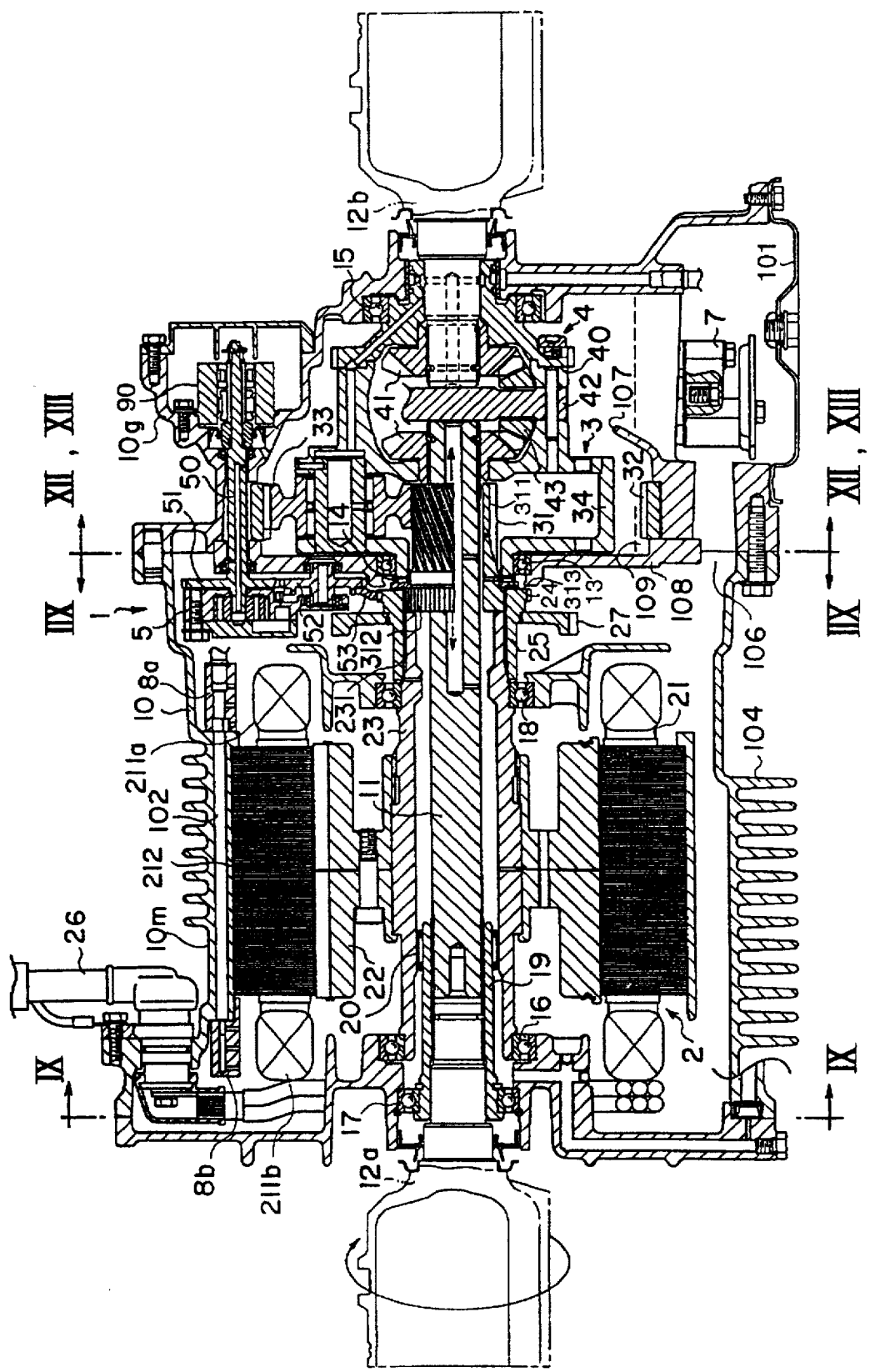
FIG. 2 is a cross-sectional side view, taken along the longitudinal axis, of an electric car drive train according to a first embodiment of the present invention.

As shown in FIG. 2, this electric car drive train 1 includes a motor 2 which, in turn, includes a stator 21 fixed to motor case 10m, the case 10 being divided into the motor case 10m and a gear case 10g. A rotor 22 is mounted radially inside of the stator 21, splined on a rotor shaft 23, and is rotatably supported by motor case section 10m through a pair of ball bearings 16 and 18 to allow for both radial and thrust forces. A planetary gear unit 3 is mounted coaxially with the rotor shaft 23 within the gear case 10g and functions as a torque transmission means for reducing and outputting the rotation of the motor 2. A differential unit 4 also functions as a torque transmission means in transmitting the output of the planetary gear unit 3 to one drive wheel through the rotor shaft 23 and directly to the other drive wheel.

The planetary gear unit 3 is composed of a sun gear 31 connected to the rotor shaft 23, a ring gear 32 and a carrier 34. The ring gear 32 is fixed to the gear case 10g with play in the radial direction. The carrier 34 is rotatably supported in the motor case section 10m and, in turn, rotatably supports a pinion meshing with the sun gear 31 and the ring gear 32, and is connected to the differential unit 4. The sun gear 31 has a toothed portion 311 meshing with the pinion 33, and a splined portion 312 axially extending from the toothed portion 311. The sun gear 31 is arranged coaxial with the rotor shaft 23 and is connected to the rotor shaft 23 through the splined portion 312.

The differential unit 4 is composed of a pair of large differential gears 41 arranged in a differential unit case 40 which consists of two joined sections and is united with the carrier 34 of the planetary gear unit 3. A plurality of small differential gears 43 (only one of which is shown) mesh with the larger differential gears 41 and are loosely fitted on a differential smaller gear shaft 42 pinned to the differential unit case 40. The bore of one differential larger gear 41 is splined to the rotor shaft 23 for transmitting output of the differential unit 4, through drive shaft 11, to a yoke shaft 12a and thereby (as indicated by phantom lines) to one drive wheel. The bore of the other large differential gear 41 is splined to a yoke shaft 12b which serves as a drive shaft for transmitting output of the differential unit 4 directly to the drive wheels. The stem portion formed at one end (right end in FIG. 2) of the differential unit case 40, is supported through a ball bearing 15 by the outer end wall of the gear case 10g, and the opposite stem portion, which is united with the carrier 34, is supported through a ball bearing 13 by a center support 108 of the motor case 10m.

As also shown in FIG. 2 a joint sleeve 19 is splined to both the drive shaft 11 and the yoke shaft 12a, thereby joining them together in a coaxial arrangement. This sleeve 19 is supported at its outer end through a ball bearing 17, which is, in turn, supported by an outer end section of the motor case 10m, and has its inner end supported, through a needle bearing 20, by the inner circumference of the rotor shaft 23.

An oil pan 101 recovers the lubricating/cooling oil from the drive unit and contains a valve body with an oil strainer and a relief valve 76. An oil pump 5 has its gear connected to the sleeve 25 of a parking gear 27 for circulating the lubricating/cooling oil to the individual portions of the drive unit mounted in the case 10. A resolver 90 is connected to an oil pump shaft 50 for detecting the rotational position of the rotor 22.

The motor case 10m has a number of outwardly projecting cooling fins 103 for releasing the heat of the motor directly to the atmosphere.

A power cable 26 supplies three-phase AC power to the motor 2.

In this embodiment the drive unit 500 serves as a second torque transmission means for transmitting the output torque of the motor 2 to the oil pump 5. This second torque transmission means is composed of an intermediate gear 53 meshing with the teeth 24 formed on the sleeve 25 and an intermediate gear 53 which is smaller than and united to the gear 53, meshing with the driven gear 51 formed integral with the oil pump shaft 50. These intermediate gears 52 and 53 are supported at their one end by the center support of the motor case 10m and at their other end by the housing of oil pump 5.

In the electric car drive train 1 described above, the rotation of the rotor 22 of the motor 2 is transmitted through the rotor shaft 23 to the sun gear 31 utilizing the sleeve 25 of the parking gear 27 as a coupling. The rotation thus transmitted to the sun gear 31 is imparted to the carrier 34 by the revolution of the pinion 33, with the reaction force received by the ring gear 32 which is fixed against rotation to the gear case section 10g, to rotate the differential unit case 40 which is united to the carrier 34. The rotation of the differential unit case 40 is transmitted through the differential small gear shaft 42 to the differential small gear 43, and then to the differential larger gears 41 to drive one drive wheel through the drive shaft 11 and the other drive wheel through the yoke shaft 12b.

The rotor shaft 23 is supported by a ball bearing 18 adjacent an extension 231 thereof splined to sleeve 25, the latter also being splined to the sun gear 31 planetary gear unit 3. The sun gear 31 has its toothed portion 311 supported by the pinion 33 and its splined portion 312 supported by the sleeve 25. The drive shaft 11 has one end supported within the differential larger gear 41 and its other end supported by the rotor shaft. The sun gear 31 is loosely fitted around the drive shaft 11, i.e. with a clearance therebetween, and is arranged with its end face at the side of the larger-diameter splined portion 312 in contact with the end face of the aforementioned splined extension. A needle type thrust bearing 14 is arranged between (1) a step 313 between the smaller-diameter toothed portion 311 and the larger-diameter splined portion 312 of the sun gear 31, and (2) the end face of an extension of the carrier 34, with one of its races radially extending into contact with the end face 313 of sleeve 25. The opposite end face of the sleeve 25 contacts the inner race of the ball bearing 18. The splined sleeve 25 of the parking gear 27 is fitted over the splined extension 231 of the rotor shaft 23 and over the splined portion 312 of the sun gear 31. Thus, the rotor shaft 23 is retained without any substantial play, in either the radial or thrust direction, through the two ball bearings 16 and 18, to precisely fix the air gap between the stator 21 and the rotor 22 of the motor 2, whereas the sun gear 31 is loosely fitted on the drive shaft 11 and is retained on the rotor shaft 23 with a proper radial clearance.

In the electric car drive train 1 thus constructed, the rotation of the rotor 22 of the motor 2 is transmitted from the rotor shaft 23, which has its axial position precisely fixed as described above, to the splined portion 312 of the sun gear 31 through the sleeve 25 of the parking gear 27. Because of the play between the splines on the inner surface of the sleeve 25 and the splines on the outer circumference of the splined portion 312, the sun gear 31 rotates in a position axially offset from and out of contact with the pinion 33 which is precisely axially positioned. The rotation thus transmitted to the sun gear 31 is imparted to the carrier 34 by the revolution of the pinion 33, with a reaction force received by the ring gear 32 fixed against rotation by the gear case section 10g. The differential unit case 40 is united to the carrier 34 for rotation therewith. The axial ends of the carrier 34 are positioned by the sun gear case 10g and the center support 108, and the sun gear 31 and the ring gear 32 rotate in proper alignment and meshing engagement with each other. This avoids the generation of noise, which might otherwise be caused by the meshing of the gear teeth. The rotation of the differential unit case 40 is transmitted through the differential smaller gear shaft 42 and the differential smaller gear 43 and then through one of the differential larger gears 41 to the drive shaft 11 splined thereto and through the other differential larger gear 41 to the yoke shaft 12b (as indicated by phantom lines in FIG. 2) splined thereto and, finally, to the right and left drive wheels (not-shown) to thereby propel the vehicle.

In operation of this drive train, the thrust force acting upon the sun gear 31 is exerted against the side of the differential unit, i.e., to the right, as indicated by a solid arrow in FIG. 2, in forward drive and in the opposite direction when not in forward drive. This thrust force is received from the step portion 313 through the thrust bearing 14 and the carrier 34 by the ball bearing 15. In reverse drive, on the contrary, the thrust force acts upon the motor side (i.e., to the left, as indicated by a broken arrow in FIG. 2), and is applied to the rotor shaft 23, which has an end face contacting the sun gear 31, while supported by the ball bearing 16.

Thus, in the drive system of the above-described embodiment of the present invention, the thrust force received by the sun gear 31 is transmitted to the ball bearing 15 to limit the thrust to one side, so that the structure can be simplified. Moreover, the thrust force in forward drive is received by the large-sized ball bearing 15 so that ball bearing 15 rotates relative to the rotation of the differential unit case 40, as reduced by the reduction mechanism, and relative to the gear case 10g. Furthermore, the thrust force is intermediately received by the thrust bearing 14, which is arranged between the step portion 313 of the sun gear 31 and the carrier 34, so that its rotation becomes relative to the sun gear 31 and the carrier 34. As a result, the rotation of the thrust bearing 14 is slower than that of the bearing receiving the thrust force directly in the case, to reduce the load upon the ball bearing 15 and the thrust bearing 14. Furthermore, the thrust bearing 14 is arranged around the sun gear 31, between the step of the sun gear 31 and the end face of the extension of the carrier 34, so that its diameter is larger than that of a prior art arrangement in which the analogous thrust bearing is located between the end face of the toothed portion of the sun gear 31 and the differential unit case 40, whereby thrust bearing 14 has a larger capacity than that of the prior art. Furthermore, the thrust force in forward drive acts to hold the ball bearing 16 of the rotor shaft 23 immovable, to thereby reduce wear of the ball bearing 16 supporting the rotor shaft 23, rotating at high speed in forward drive.

Figure 3:
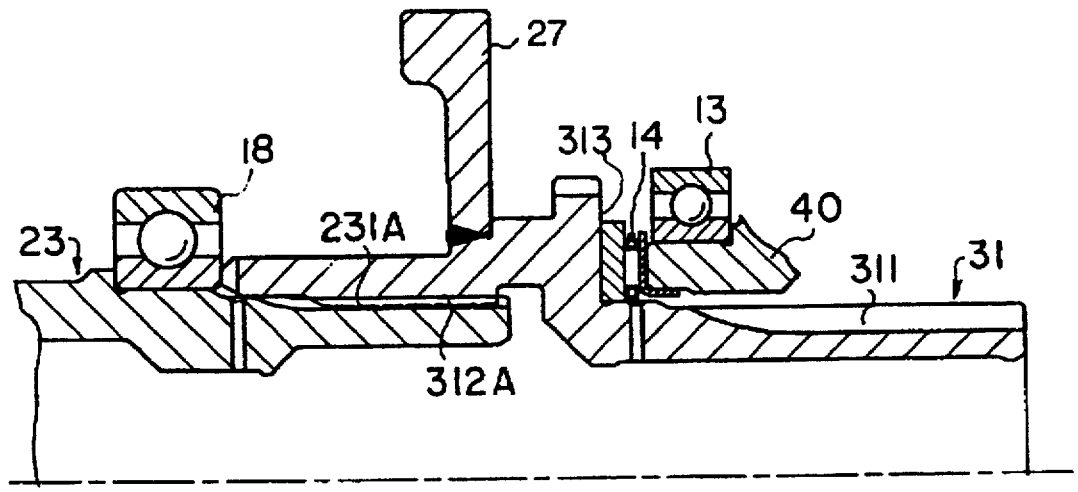
FIG. 3 is an enlarged cross-sectional view showing details of a splined portion of a second embodiment of the present invention.

FIG. 3 shows a second embodiment in which the joint between the sun gear 31 and the rotor shaft 23 is modified. In this embodiment, the sleeve 25 of the parking gear 27, used to couple the rotor shaft 23 and the sun gear 31 in the first embodiment, is modified in that, in this second embodiment, the sleeve 25 is integral with the sun gear 31. Specifically, the splined portion 312A of the sun gear 31 and the splined portion 231A of the rotor shaft 23 are radially overlapped over a predetermined axial length to provide a coaxial shaft structure. This construction is advantageous from the viewpoint of reduction of the number of parts and simplification of the assembly process. In this embodiment, the thrust force which acts upon the sun gear 31 in reverse drive is borne by the case 10 through the ball bearings 16 and 18 and the rotor shaft 23.

Figure 4:
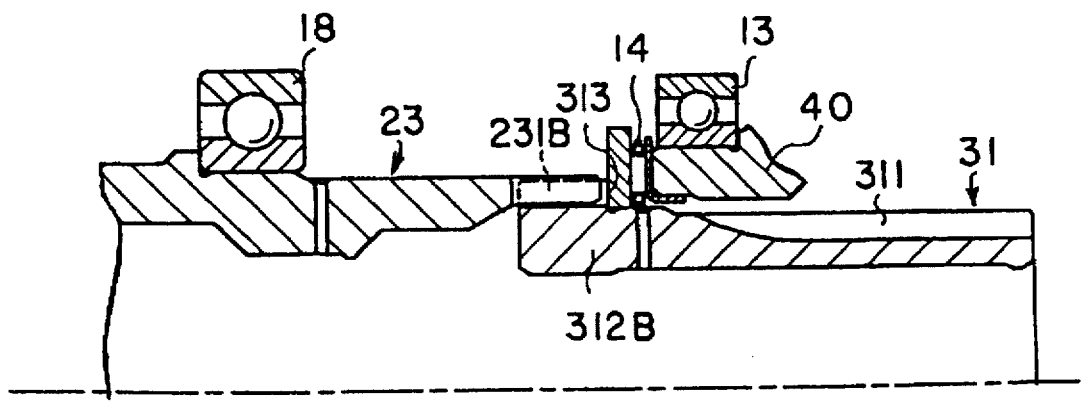
FIG. 4 is an enlarged cross-sectional view showing details of a splined portion of a third embodiment of the present invention.

FIG. 4 shows a third embodiment in which the joint between of the sun gear 31 and the rotor shaft 23 is further modified. In this embodiment, the sun gear 31 and the rotor shaft 23 are joined by an outer circumferential spline 312B formed in the splined portion 312 of the sun gear 31 and a fork 231B formed at the end portion of the rotor shaft 23, to provide a joint structure in which the two members in the splined portion 312 have no overlap of thickness in the radial direction. This construction is particularly advantageous when the radial space available for the joint is restricted.

Figure 5:
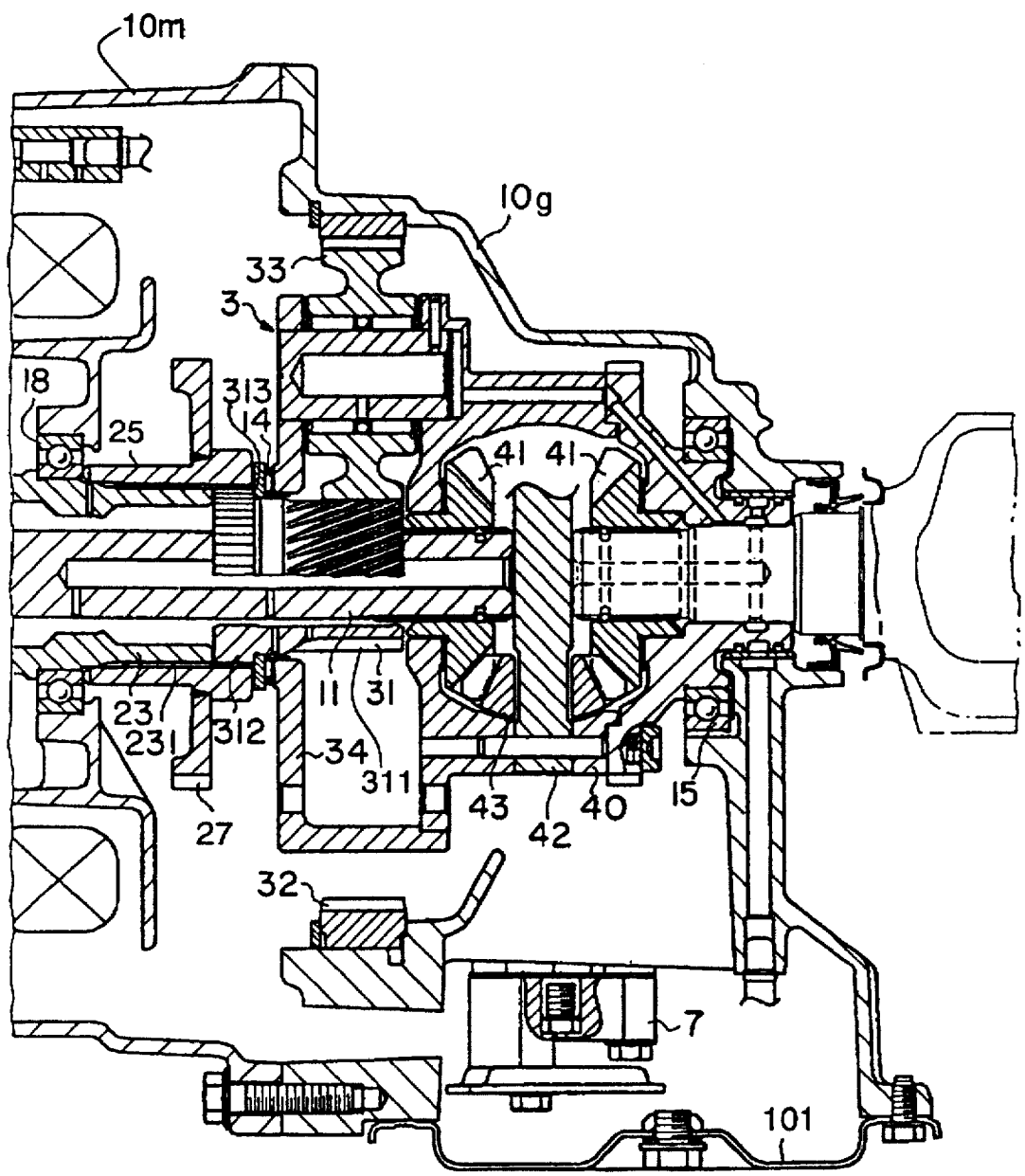
FIG. 5 is a cross-sectional view showing a portion of a fourth embodiment of the present invention.

FIG. 5 shows a fourth embodiment of the electric car drive train of the present invention. In this embodiment the carrier 34 is supported at its side opposite the motor (the right side in FIG. 5) in the gear case 10g by the ball bearing 15 through the differential unit case 40, which is united with the carrier 34, and at its side nearest the motor (left side in FIG. 5) at two points, i.e. by ball bearing 15 and by the ring gear 32, the ring gear being fixed in position without any play in the radial direction. This fifth embodiment differs from the first embodiment in that an oil pump is not provided between the motor 2 and the planetary gear unit 3 and no resolver is radially outward of the planetary gear unit 3. Thus, the present embodiment is different from the first embodiment in that the components relating to the oil pump 5 and the resolver are eliminated. However, the remaining construction is similar to that of the first embodiment, and its description will be omitted insofar as it is identical to the first embodiment.

Thus, the carrier 34 has its motor side automatically aligned by the meshing engagement with the ring gear 32 of the pinion 33, and the sun gear 31 is also automatically aligned by the meshing engagement with the pinion 33, so that they can be held in an excellent meshing engagement without canting, i.e. bearing together at one end. Thanks to this arrangement, unlike the first embodiment shown in FIG. 2, the ball bearing 13 supporting the carrier 34 at the motor side can be eliminated and the axial length can be accordingly shortened.

The present invention has been described in connection with embodiments in which the motor 2 and the drive shaft 11 are made coaxial, i.e., in which the drive shaft 11 extends through the sun gear 31. Although the present invention is advantageous if applied to such construction, it is not limited thereto but can also be applied to a drive train lacking such a coaxial arrangement. In addition, the present invention can be practiced by modifying the specific construction of individual portions, as necessary, within the scope of the claims.

Figure 6:
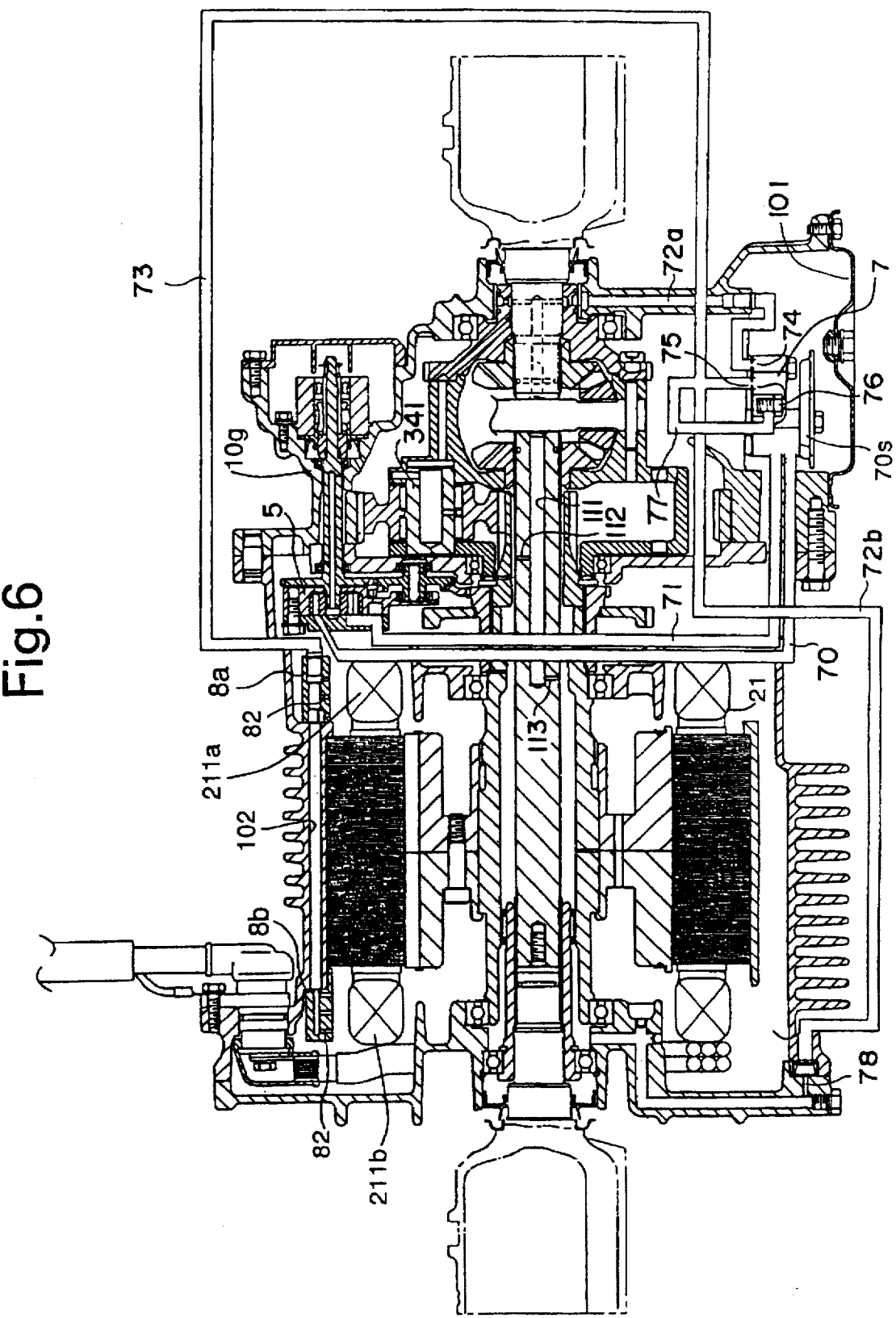
FIG. 6 is a cross-sectional view of an embodiment of the present invention with a superimposed circuit diagram showing the connections of the hydraulic circuit.
Figure 7:
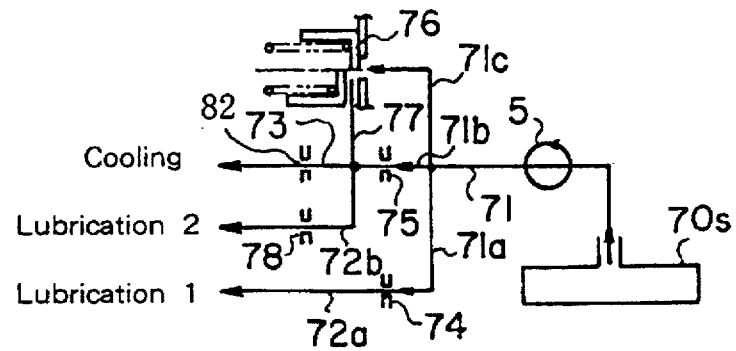
FIG. 7 is a circuit diagram showing a portion of the hydraulic circuit according to an embodiment of the present invention.

FIG. 6 schematically enlarges those portions of the hydraulic circuit of the aforementioned electric car drive train 1 which are not clearly seen in FIG. 2. In the lower portion of the gear case 10g, there is fixed the valve body 7 which has the aforementioned strainer 70s and the valve 76 mounted therein. The valve body 7 and the oil pump 5 are connected through a suction line 70 and a return line ("discharge circuit") 71. The return line 71 is branched in the valve body 7 of this example, into three oil passages, as shown in FIG. 7. The first oil passage 71a has an orifice 74 which serves as the aforementioned "first throttle means" and leads to a first lubricating oil passage 72a downstream of the orifice. This oil passage 72a extends through the end wall of the gear case 10g to the step of the differential unit case 40 at the support portion and there divides into two branches. One of these branches extends through the case wall of the differential unit case 40 to the pinion support shaft 341 of the carrier 34 and terminates at the radial oil port of that shaft. The other branch opens into the differential unit case 40 through the oil passage in the yoke shaft 12b and terminates at two radial oil ports 112 and 113 through an oil passage 111 in the drive shaft 11.

Figure 8:
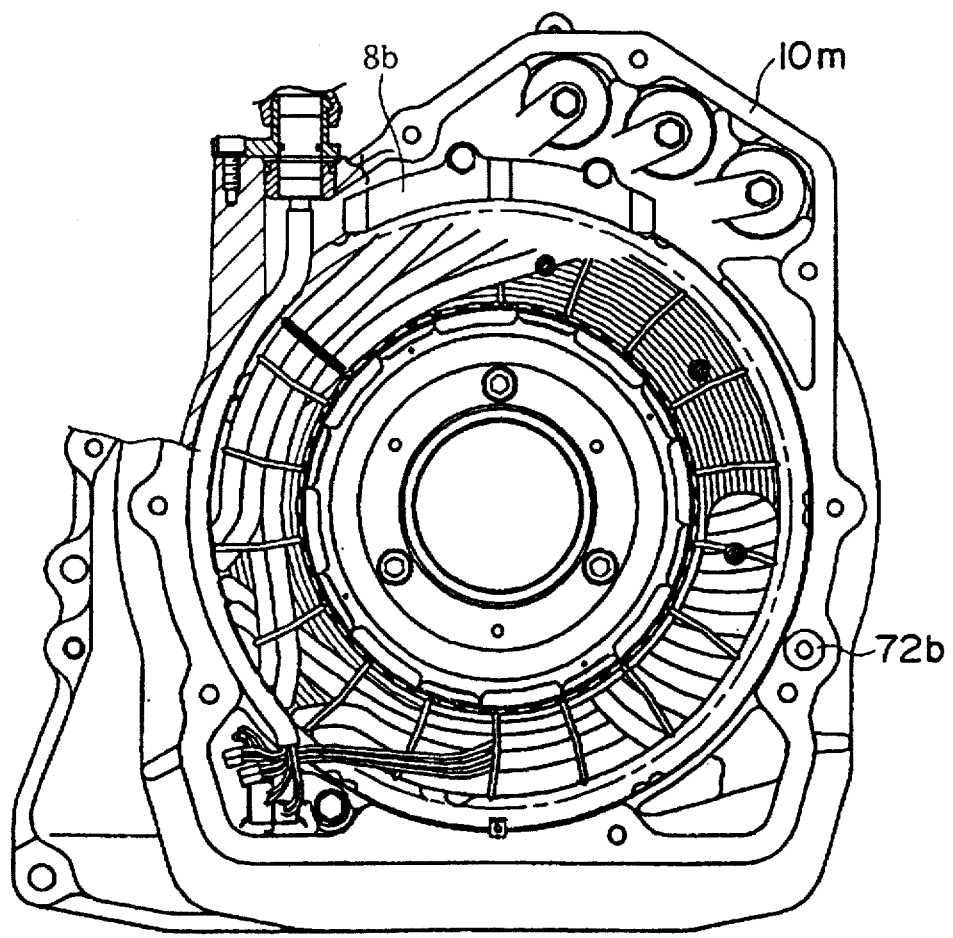
FIG. 8 is a cross-sectional view taken along arrows IX—IX of FIG. 2.
Figure 9:
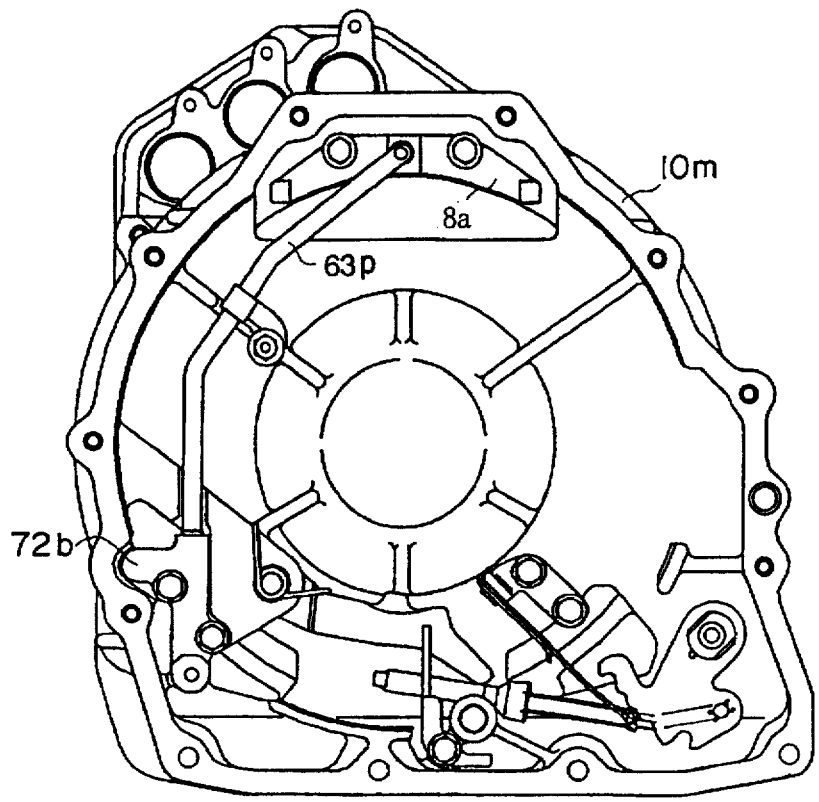
FIG. 9 is a cross-sectional view taken along arrows IIX—IIX of FIG. 2.

The second oil passage 71b, or the second of the three branches in the valve body 7, is provided with an orifice serving as the aforementioned second throttle means 75. The second oil passage 71b is divided downstream of the orifice into two branches, as shown in FIG. 7, one of which forms a second lubricating oil passage 72b. This oil passage 72b extends through the circumferential wall of the motor case 10m, as shown in FIGS. 8 and 9, and is throttled by third throttle means 78, i.e., an orifice in the left end section. The oil passage 72b extends to the support portion of the end section at the outer left end side of the motor case 10m where it terminates and opens into the space between the joint sleeve 19 and the rotor shaft 23. The other of the two branches of oil passage 71b constitutes the cooling circuit 73 in this example and is connected through a connection pipe 63p in the motor case 10m as shown in FIG. 9, which feeds one (8a) of a pair of cooling oil ejection members 8a and 8b mounted in the upper portion of the motor case 10m. As seen in FIG. 6, an uppermost oil passage 102 in the motor case 10m connects the two cooling oil ejection members 8a and 8b. These cooling oil ejection members 8a and 8b are individually formed with multiple fourth throttle means 82 for functioning as nozzles directed to first and second coil ends 211a and 211b of the stator 21 of the motor 2.

In this example, as shown in FIG. 7, a third oil passage 71c, i.e. the third of the three branches in the valve body, leads to a direct relief type valve 76 which opens against a spring load, when the oil pressure of the discharge circuit 71, i.e., the primary pressure, exceeds a predetermined level, to relieve the oil from the discharge line 71 by feed to the cooling circuit 73. The valve 76 has its secondary side, i.e., its discharge side, connected to the second lubricating oil passage 72b and the cooling circuit 73 by way of line 77.

In the drive train of the embodiment thus far described, the oil is sucked through strainer 70s by the pump 5 and returns via the discharge line 71 to the valve body 7 where oil is distributed to the aforementioned three branches. The oil having entered the first oil passage 71a has its flow rate regulated by the orifice 74 and feeds the oil groove of the support portion of the differential unit case 40 in the gear case 10g. One oil flow is guided between the yoke shaft 12b and the stem of the differential unit case 40 from the oil port in the wall of the differential unit case 40 into the oil passage 341 in the pinion support shaft. This oil is discharged from the radial oil ports leading from the oil passage 341 to lubricate the needle bearing and the thrust washer. On the other hand, the oil having entered the oil passage in the yoke shaft 12b is guided into the differential unit case 40 to lubricate the meshing faces of the differential gears, the sliding faces of the differential larger gear 41 and the differential unit case 40, the splined portions of the differential larger gear 41, the drive shaft 11 and the yoke shaft 12b, and the sliding faces of the differential smaller gear 43, the differential smaller gear shaft 42 and the differential unit case 40. The oil is discharged from the radial oil ports 112 and 113 via the oil passage 111 in the drive shaft 11 to lubricate the meshing faces of the sun gear 31 and the pinion 33, the bearing 14, the ball bearing 13, the portions of the rotor shaft 23 and the sun gear 31 splined together by the sleeve 25, the ball bearing 18, the splined portion of the drive shaft 11 and the sleeve 19, and the needle bearing 20. The oil having finished the lubrication is thrown against the case wall and flows down along the case wall and into the oil reservoir.

The flow of oil through the second lubricating oil passage 72b is throttled by the third throttle orifice 78 and is fed through a passage in the support portion of the external end cover of the motor case 10m, to lubricate the ball bearings 16 and 17 and so on. After this, the oil flows down along the case wall and collects in the oil reservoir.

As seen in FIG. 9, the oil in the cooling circuit 73 flows through the connection pipe 63p to the cooling oil ejection members 8a and 8b for ejection from the multiple nozzle holes (or ejection ports) formed therein. This ejected oil contacts and cools the first and second coil ends 211a and 211b. After having cooled the first and second coil ends 211a and 211b, this oil also flows downward directly or along the case wall, to the lowermost portion and further through the lower opening of the center support 108 of the motor case 10m and collects in the oil reservoir.

The oil reservoir for recovering the lubricating/cooling oil is formed in the lower portion of the gear case 10g and has its bottom closed by the oil pan 101. Suspended within this oil reservoir is the valve body 7 which has the oil strainer 70s and the relief valve 76 mounted therein. The communication between the motor case 10m and the gear case 10g is provided by an aperture 106 which extends through the lower portion of the center support 108 of the motor case 10m. The oil pump 5 and the valve body 7 are connected to each other by the suction circuit and discharge circuit (not-shown), which are formed in the wall of the center support 108.

Figure 10:
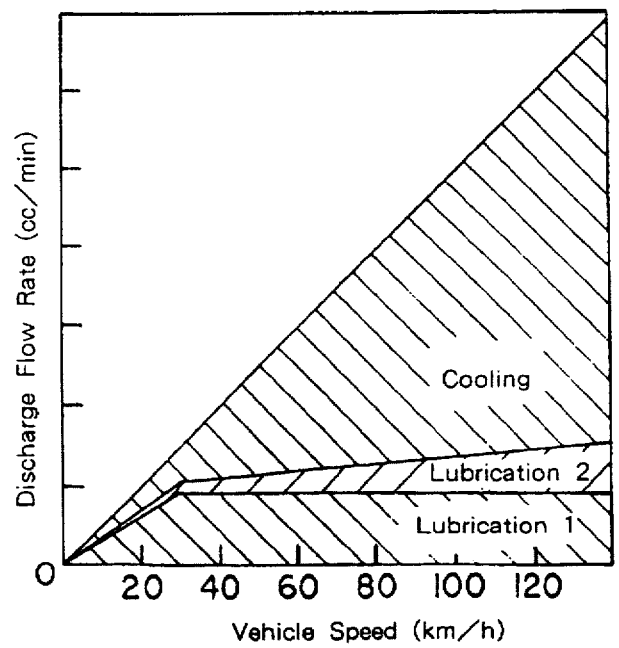
FIG. 10 is a graph of discharge rate of an oil pump versus vehicle speed in an embodiment of the present invention.

FIG. 10 illustrates the distribution of the oil discharged from the pump 5 to the individual portions. As seen in FIG. 10, the discharge flow rate rises in proportion to the vehicle speed reflecting the R.P.M. of the motor. The oil flow (as indicated by "Lubrication 1" in FIG. 10) fed to the first lubricating oil passage 72a, as shown in FIG. 7, will not increase for a vehicle speed exceeding the relief pressure (indicated by the break in the flow rate curve) because the absolute flow rate is restricted by the first throttle means 74 due to the oil pressure relieving action of the discharge circuit 71 through the valve 76. On the contrary, the oil flow (indicated as "Lubrication 2" in FIG. 10) fed to the second lubricating oil passage 72b will slightly increase with rise in the vehicle speed in accordance with the rise of the secondary pressure fed through the valve 76 to the circuit between the second throttle means 75 and the third throttle means 78, although it is finally restricted by the third throttle means 78. On the contrary, the oil flow fed to the cooling circuit 73 increases with rise in the vehicle speed because it is the remainder of the discharge flow which increases in proportion to the vehicle speed. Thus, according to the circuit of the aforementioned embodiment, the oil flow fed to the lubrication circuit 72 is substantially constant, independent of any change in the vehicle speed, so that the remaining oil flow can be wholly applied to cooling. As a result, it is possible to avoid an increase in the resistance to the rotation of the torque transmission means, which might otherwise be caused as in the prior art by the excessive feed to the lubrication circuits. By appropriating excess oil flow to the lubrication circuit for use in the cooling circuit, the drive loss of the oil pump can be reduced to the extent of eliminating the excess oil flow, i.e. reducing the total flow rate by that excess amount.

Summarizing, in the hydraulic circuit of the aforementioned embodiment, the oil circulated in the system by the oil pump 5 is optimally distributed by the orifices in the lubricating and coil cooling circuits, and the oil for lubrication is held constant, independently of the speed, by the regulating action of the valve 76, while the remainder remains available for the coil cooling operation.

In this embodiment the motor case 10m is formed with fins 104 to enhance the cooling efficiency. As a result, an abrupt temperature rise is prevented at low-speed and high-load by the cooling capacities of the motor body and the fins, and maximum cooling oil can be ejected onto the coil at the intermediate/high speeds to effect the cooling operation efficiently without any local temperature rise.

Figure 12:
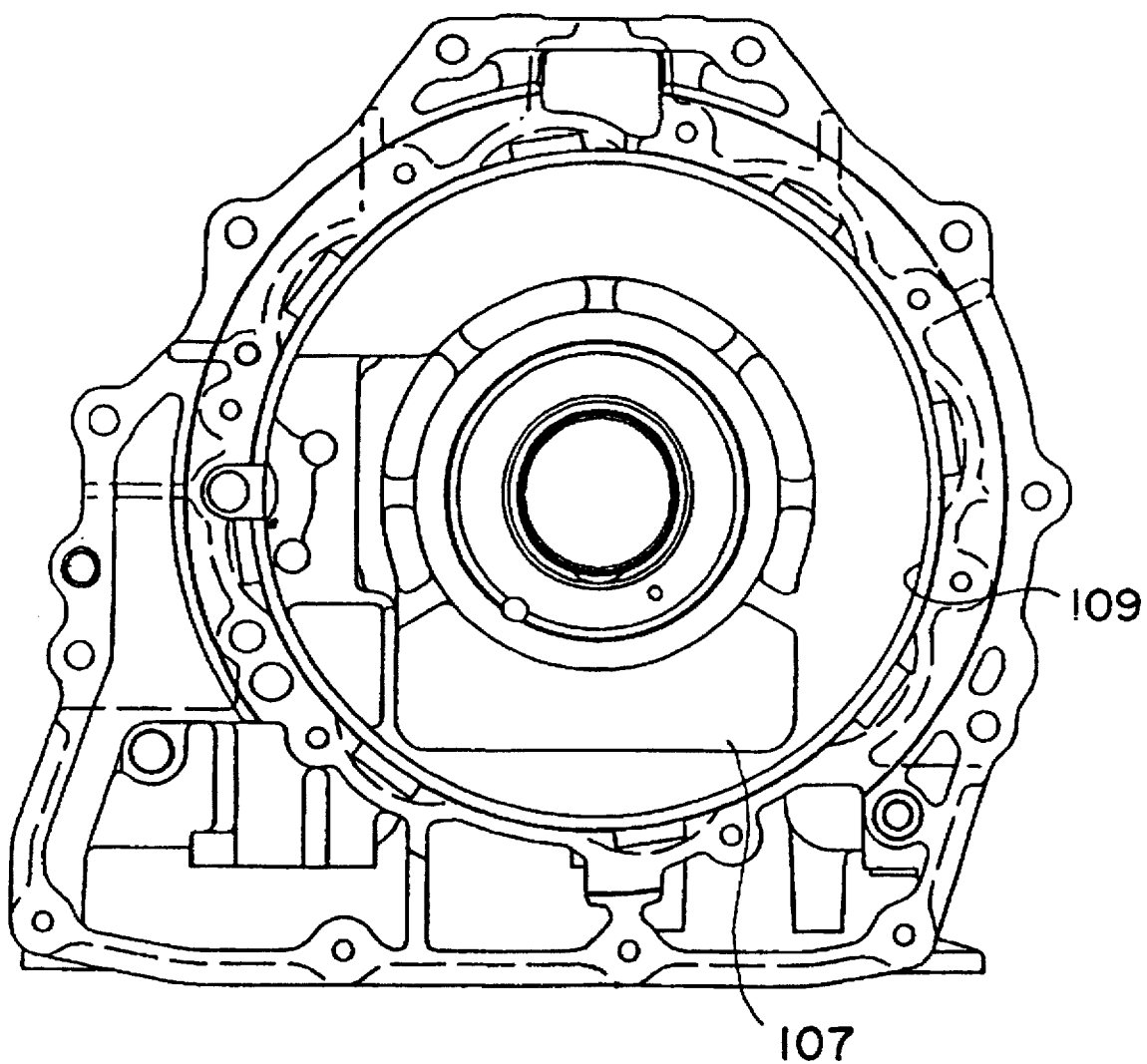
FIG. 12 is a cross-sectional view taken along arrows XIII—XIII of FIG. 2 with a planetary gear unit and a differential being removed.

Incidentally, it is very important in the context of an electric car to improve the efficiency of the drive train. In the present embodiment, therefore, the drive train is arranged coaxially with the right and left drive wheels to improve the efficiency of the entire drive train, including the gear efficiency. However, conventional drive train arrangements on one axis impose restrictions on radial and axial dimensions due to the need to retain the minimum road clearance. In order to retain sufficient oil flow for the lubricating and cooling operations in the drive train under such restrictions, even the rotating portions of the planetary gear must be dipped into the oil, so that the agitation loss increases to lower the efficiency of the drive train. This design problem is overcome in the present embodiment in that the center support 108 of the motor case 10m and the ring gear supporting portion of the gear case 10g together define a gear chamber 109, which is at a level higher than the oil collected in oil pan 101, with an aperture 107 for discharging the oil from the inside of the gear chamber 109, as shown in FIG. 12. Moreover, the center support 108 is constructed to prevent the invasion of oil from the motor 2. As a result, the oil collecting in the gear chamber 109 is discharged from the aperture 107 at the initial rotating stage of the motor 2 by the rotation of the planetary gearing 3. In this design, moreover, the oil, once discharged, is prevented from re-entering the gear chamber 109 so that the oil loss, which might otherwise be caused by the agitation of the planetary gearing 3, can be reduced.

Figure 13:
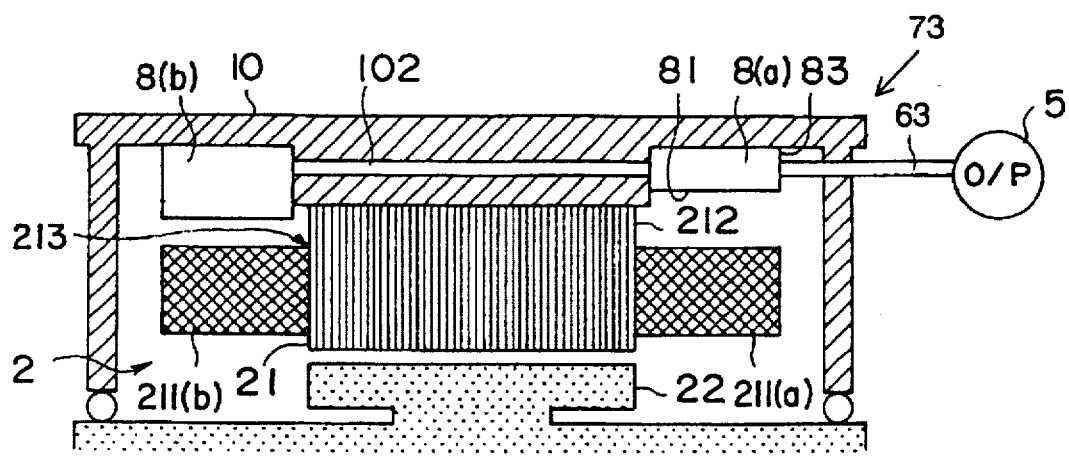
FIG. 13 is a schematic diagram in cross-section showing the entirety of an axial section of a motor equipped with a cooling circuit according to an embodiment of the present invention.
Figure 14:
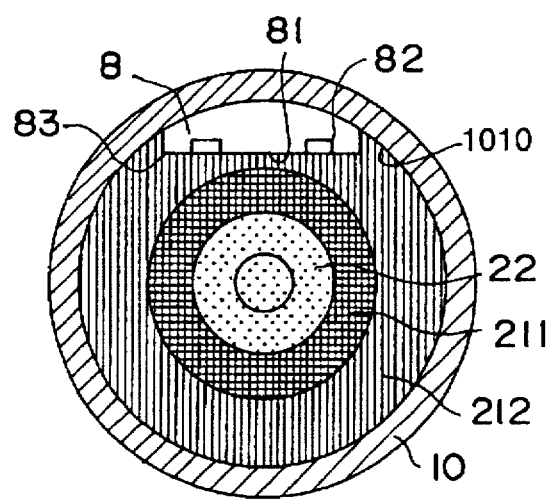
FIG. 14 is a schematic diagram of the motor of the above embodiment, as a transverse cross-section.
Figure 15:
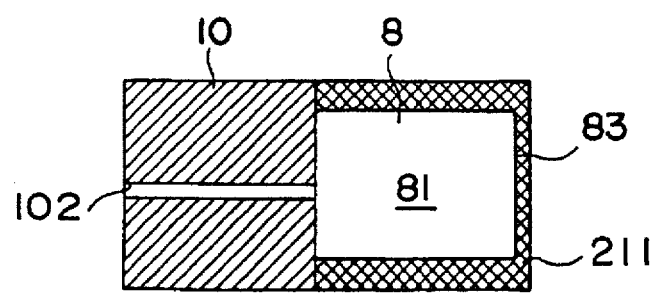
FIG. 15 is a schematic diagram showing a cooling oil ejecting unit of the foregoing embodiment.

FIGS. 13, 14 and 15 illustrate the cooling of the motor in accordance with the present invention. The motor 2 is composed of the stator 21, having a cylindrical core 212 fixed to the inner wall of the case 10 and formed with a plurality of slots in its inner circumferential surface, a coil 213 winding through the slots of the core 212, with coil ends 211 extending beyond the axially spaced end faces of the core 212. The rotor 22 is arranged radially inside of the stator 21 and rotatably supported by the case 10. The system further includes an oil pump 5 driven by suitable means, and cooling circuit 73 having an oil feed passage 63 for feeding the oil discharged from the oil pump 5 to a point above the motor 2.

As shown in FIG. 14, the cooling circuit 73 includes a cooling oil ejecting unit 8 having a flat ejection face 81 confronting the coil end 211, and ejection ports 82 formed in the ejection face 81 for ejecting the oil received from the oil feed passage 63. The cooling oil ejection unit 8 is arranged with the ejection face 81 spaced from wall 110 of the adjoining case 10, and the ejection face 81 has its end portion 83 positioned above the coil end 211, as shown in FIG. 15. In this embodiment, the cooling oil ejection unit 8 is composed, as shown in FIG. 13, of the first and second cooling oil ejection units 8a and 8b located above, respectively, the first and second coil ends 211a and 211b positioned at the axially spaced ends of the core 212. As seen in FIGS. 2 and 13, the two cooling oil ejection units 8a and 8b are connected by the axial oil passage 102 formed in the case 10.

In the cooling circuit 73 thus constructed, the oil is ejected as a spray, given a sufficient discharge from the oil pump 5, from the ejection ports 82 directly onto the coil end(s) 211. If the discharge of the oil pump 5 is not sufficient, on the other hand, the oil collects on the ejection face 81 of the cooling oil ejection unit 8 until it falls in the form of droplets. The end portions 83 of the ejection faces 81 are arranged above the coil end(s) 211. As a result, the oil falls as droplets onto the coil end(s) 211 from arbitrary positions on the ejection faces 81, i.e., from the axial end portions and the circumferential end portions 83 even at the outermost sides. Thus, the oil can be reliably fed to the coil end(s) 211, even if a spray does not form due to insufficient discharge from the oil pump 5.

Figure 16:
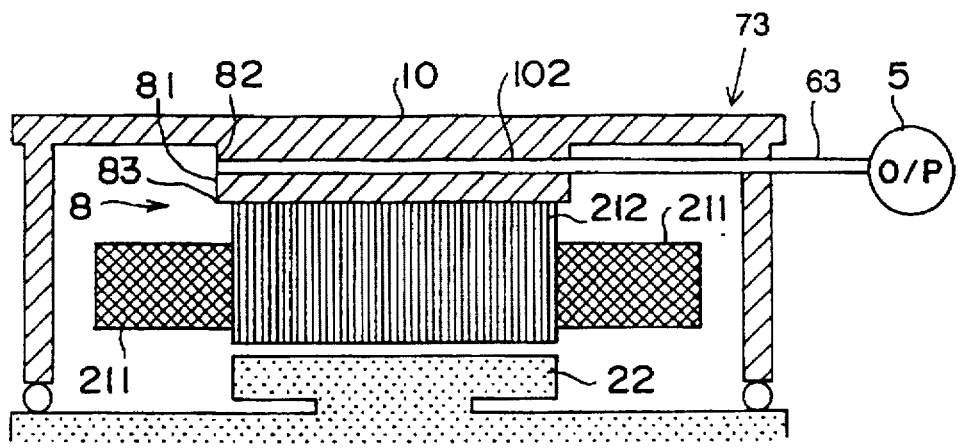
FIG. 16 is a schematic diagram similar to FIG. 13 but showing a fifth embodiment of the present invention.
Figure 17:
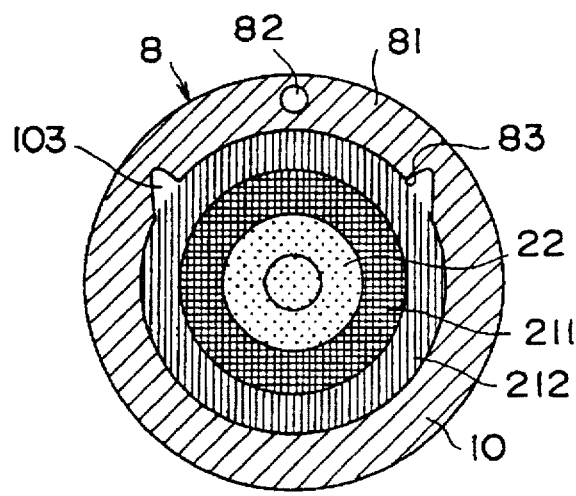
FIG. 17 is a schematic diagram showing the motor of the fifth embodiment, in transverse cross-section.

FIGS. 16 and 17 illustrate a fifth embodiment wherein the cooling oil ejection unit 8 is formed in (integrated with) the circumferential wall of the case 10. In this embodiment, the ejection face 81 is coextensive with the width of the coil and the ejection port 82 has its axis in parallel with the axis of the coil end 211 or has its axis intersecting the axis of the coil end 211 at an acute angle. The ejection face 81, united with the wall face of the case 10, is set off from the interior surface of the circumferential wall 1010 by axial notches 103 in the inner surface of circumferential wall 1010 of the case, which notches 103 form the end portions 83. As a result, the ejection face 81 and the interior surface of the circumferential wall 1010 of the adjoining case 10 are spaced apart. In this embodiment, also, the end portions 83 are positioned above the coil end(s) 211.

In the cooling circuit of this fifth embodiment also, oil ejected from the ejection port 82 if insufficiently discharged, will flow, along the wall surface of the case 10 until it reaches the notches 103 where it collects and falls as droplets onto the coil end(s) 211. In this embodiment ejection port 82 has its axis in parallel with that of the case 10 so that it can be easily formed, even though formed directly in the case 10. This advantage can be achieved by using the notches 103 to isolate the ejection face 81 so that the ejection port 82 need not necessarily be directed downward.

Figure 18:
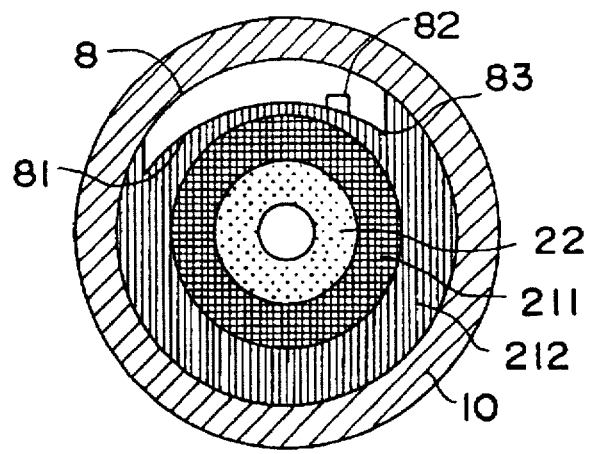
FIG. 18 is a schematic diagram of a motor in a sixth embodiment of the present invention, in transverse cross-section.

FIG. 18 illustrates a sixth embodiment, which is a modification of the foregoing embodiment wherein the ejection face 81 is sloped. The ejection face 81 in this embodiment is a concave cylindrical face, one end portion 83 of which is longer than the other, with respect to the uppermost portion of the case wall in the direction of rotor rotation. The ejection port 82 is formed in a position slightly lower than the uppermost portion of the ejection face 81. In this embodiment, the longer end portion 83 (right side in FIG. 18) need not be positioned above the coil end 211. This is because the oil, having exited from the ejection port 82 along the ejection face 81, will not flow over the uppermost portion of the ejection face 81 to the opposite side.

Thus, the oil is ejected, with sufficient discharge from the oil pump 5, directly from the ejection port 82 onto the coil end 211, but at discharge pressure too low for ejection directly onto coil end 211, the oil flows out of the ejection port 82 downslope along the ejection face 81. The oil falls as droplets onto the coil end 211 due to the gravity when its accumulation at the end portions 83 of the ejection face 81, forming discontinuous corners with respect to the inner circumference of the case 10, reaches a predetermined amount. Thus, in this embodiment also it is possible to prevent wasted circulation of oil, i.e. oil which might otherwise flow down along the inner circumference of the case 10 and not be used for cooling the coil.

Figure 19:
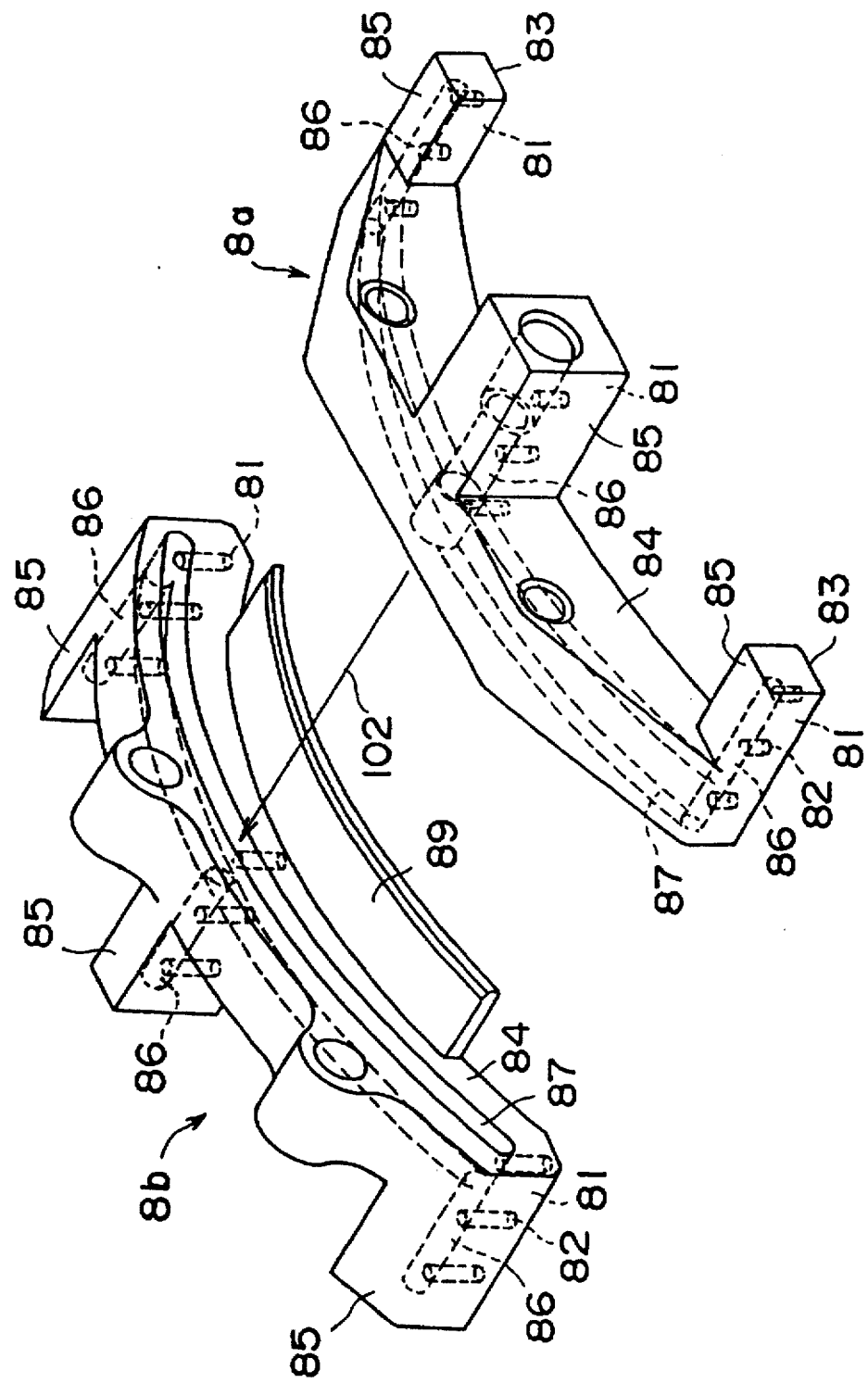
FIG. 19 is a perspective view showing a cooling oil ejection member according to an embodiment of the present invention.

As shown in detail in FIG. 19, the first cooling oil ejection member 8a is formed with three ejection faces 81 formed as the lower faces of three axial extensions 85 branched from a circumferential extension 84, the axial extensions 85 being in a comb-tooth shape. Plural ejection ports 82 are formed in each of the ejection faces 81 in three axially extending rows. Three ejection oil passages 86 serve to connect the ejection ports 82 in the individual axial rows. The ejection oil passages 86, in turn, are connected to each other by an upwardly convex channel or groove 87 formed in the end face at which the circumferentially extending body 84 contacts the motor case. Likewise, the second cooling oil ejection member 8b is formed with an upwardly convex circumferentially extending groove or channel 87 formed along the face contacting the motor case, the groove 87 being connected to the axial oil passage 102. In ejector 8b, as in ejector 8a, ejection faces 81 are formed as the lower faces of the axial extensions 85, with three ejection ports 82 formed in each ejection face 81. The three ejection oil passages 86 respectively connect each set of ejection ports 82 with the circumferential groove 87. A flange 89 protrudes in the axial direction from the circumferential extension 84 into abutment against the inner circumference of the motor case.

In the cooling oil ejection members 8a and 8b thus constructed, the aforementioned connection pipe 63p (FIG. 9) connects to one of the ejection oil passages 86 of the first cooling oil ejection member 8a, i.e., to the central ejection oil passage 86.

Figure 20:
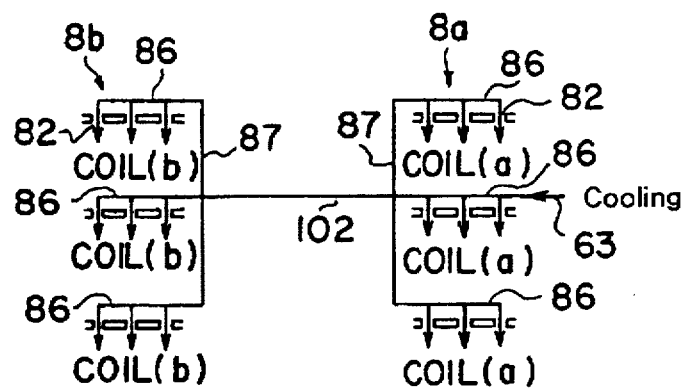
FIG. 20 is a circuit diagram showing the cooling oil ejector of the embodiment of FIG. 19.
Figure 11:
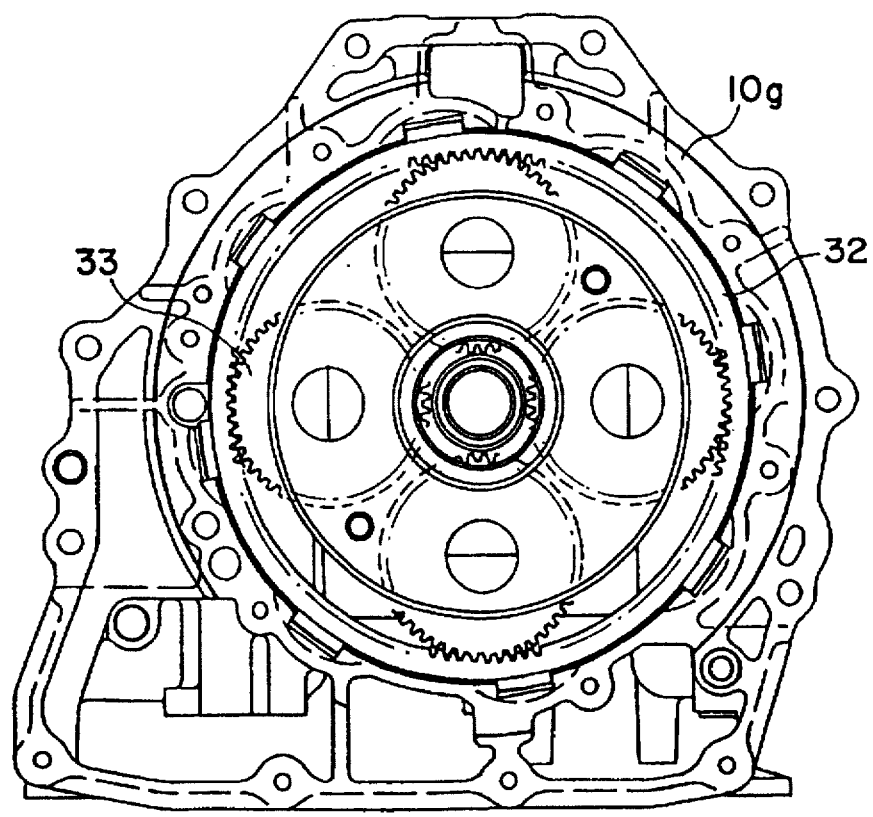
FIG. 11 is a cross-sectional view taken along arrows XII—XII of FIG. 2.

FIG. 20 is a circuit diagram showing the connections between the two cooling oil ejection members 8a and 8b and the axially extending cooling oil passage 102 formed in the motor case. In this embodiment, as apparent from FIG. 20, the rows of three ejection ports 82 in the cooling oil ejection member 8a (and passages 86) are arranged in parallel with the oil feed passage, excepting the central ejection oil passage 86 connected to the feed oil passage 63, and the ejection oil passages 86 in the cooling oil ejection member 8b are arranged in parallel with oil feed passages, excepting the central ejection oil passage 86 connected to the axial oil passage 102.

Figure 21:
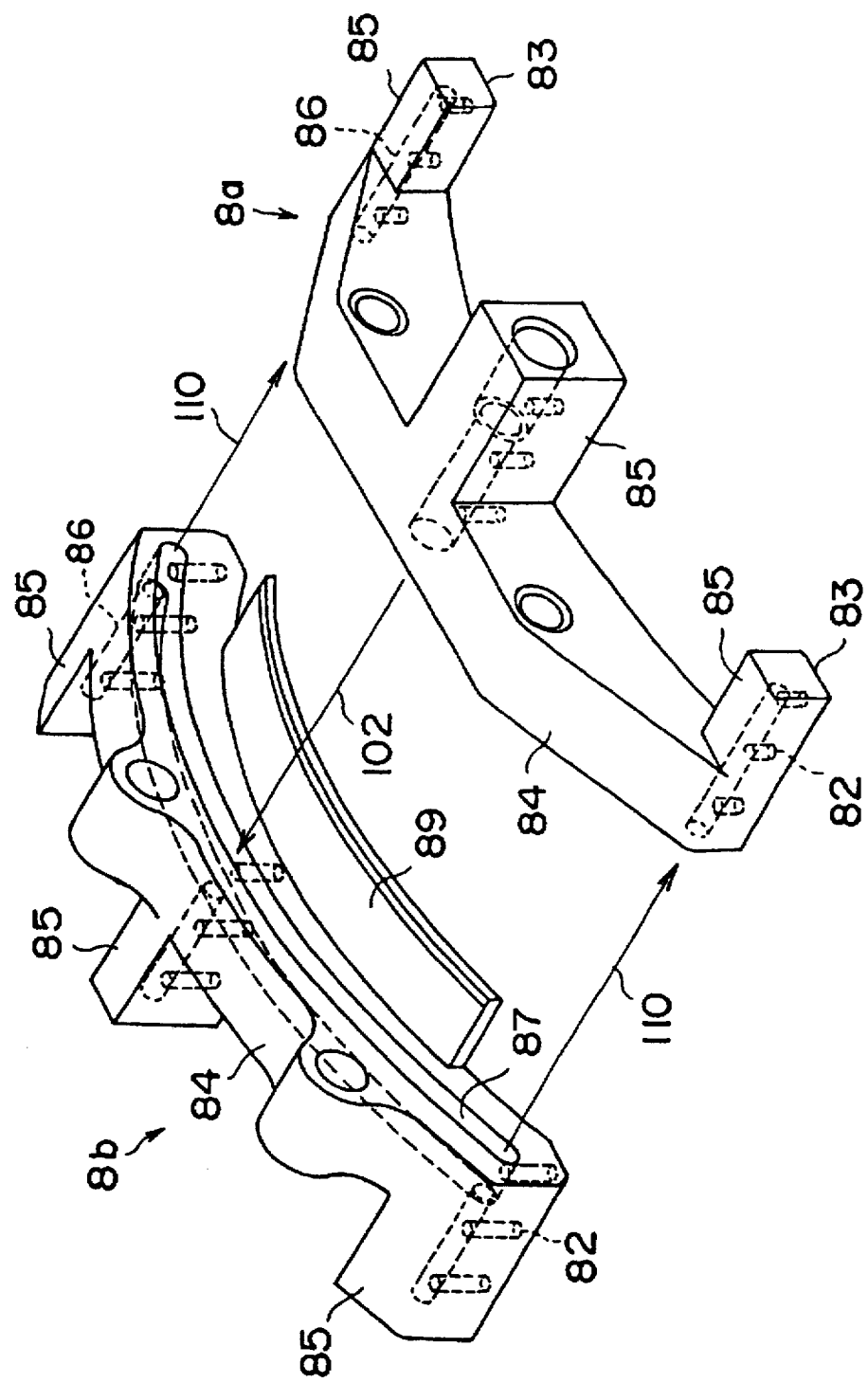
FIG. 21 is a perspective view of a cooling oil ejector member of a seventh embodiment of the present invention.
Figure 22:
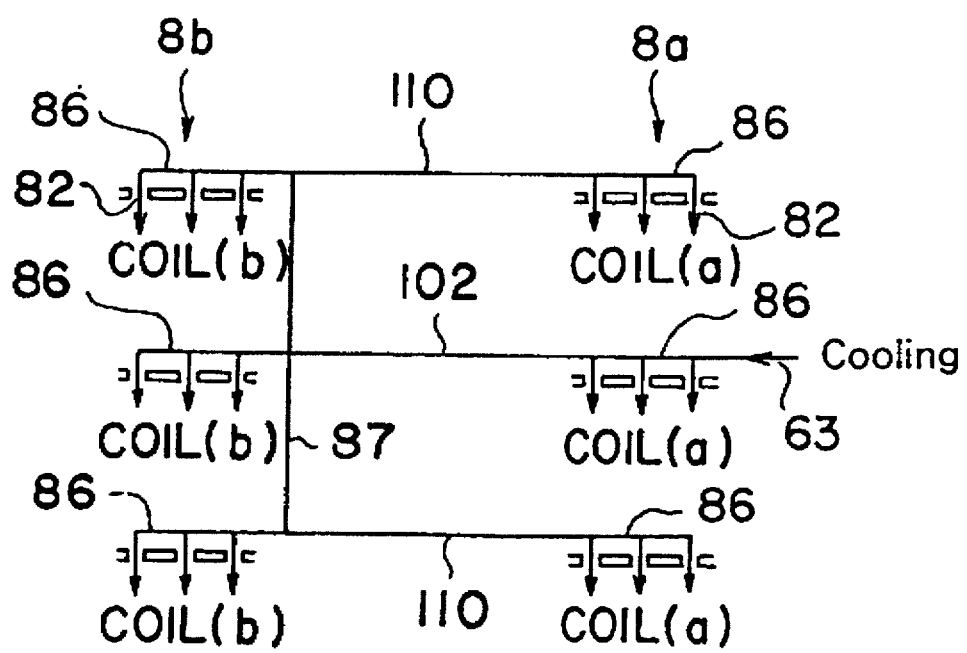
FIG. 22 is a circuit diagram for the cooling oil ejection unit of the seventh embodiment.

Finally, FIGS. 21 and 22 show a seventh embodiment in which the first cooling oil ejection member 8a has no circumferential oil passage as in the embodiment of FIG. 19. However, the second cooling oil ejection member 8b is formed like that of the embodiment of FIG. 19 but with a slightly wider circumferential groove 87b formed along the face contacting the motor case. As in the previously described embodiments, the groove 87b connects to the axial oil passage 102. Ejection faces 81b are formed as the lower faces of axial extensions 85b with three ejection ports 82 formed in each of the individual ejection faces 81b, as before. The three ejection oil passages 86, each connecting a set of three ejection ports 82, receive oil from the circumferential groove 87.

FIG. 22 is a circuit diagram showing the connections between the first and second cooling oil ejection members 8a and 8b and the axially extending cooling oil passage 102 formed in the case. In this embodiment, as is apparent from the oil passage arrangement of FIG. 22, each row of the individual three ejection ports 82, in each of cooling oil ejection members 8a and 8b, are connected in series with each other through the axial oil passage 110 which is formed above the case but is slightly below and spaced from the axial oil passage 102. In this arrangement, the right and left ejection oil passages 86 are in series with the central ejection oil passage 86, and the rows of three ejection ports 82 each are also connected in a single series inclusive of cooling oil ejection members 8a and 8b.

In this seventh embodiment, the oil discharged from the oil pump 5 is fed through the valve body 7 from the connection pipe 63p to the central ejection oil passage 86 of member 8a for ejection from each of the ejection ports 82 of the oil passage 86 onto the first coil end. The remaining oil enters the circumferential groove 87 of the second cooling oil ejection member 8b via the axial oil passage 102 and then enters the individual ejection oil passages 86 for ejection from the individual ejection ports 82 onto the second coil end. The oil reaching the ends of the groove 87 is fed via the other axial oil passages 110 to the ejection oil passages 86 at the opposing sides of the first cooling oil ejection member 8a for ejection onto the first coil end. Thus, in this embodiment, the cooling oil is ejected at a low rate by the first cooling oil ejection member 8a but fed to the second cooling oil ejection member 8b, and the remaining oil is returned to the first cooling oil ejection member 8a. As a result, it is possible to equalize the oil flows fed to the first and second cooling oil ejection members 8a and 8b.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic circuit for an electric car drive train, comprising:

a motor;

torque transmission means for transmitting the output torque of said motor to drive wheels;

an oil pump for discharging oil from an oil reservoir;

drive means for rotatably driving said oil pump;

a discharge circuit for receiving oil discharged from said oil pump;

a first lubrication circuit connected to said discharge circuit through first throttle means for feeding oil to said torque transmission means;

a cooling circuit connected to said discharge circuit through second throttle means for feeding oil to said motor; and a valve arranged, upstream of said second throttle means, between said discharge circuit and said cooling circuit for feeding oil from said discharge circuit to said cooling circuit, by-passing said second throttle means, responsive to oil pressure in said discharge circuit exceeding a predetermined level.

2. A hydraulic circuit for an electric car drive train according to claim 1, further comprising an oil passage downstream of said second throttle means which splits to form a first passage for feeding oil to said cooling circuit and a second passage for feeding oil to a second lubrication circuit.

3. A hydraulic circuit according to claim 1 wherein said drive means is a torque transmission means for transmitting the output torque of said motor to said oil pump.

4. A hydraulic circuit for an electric car drive train, comprising:

a case having an inner, axially extending circumferential surface defining an interior for said case;

a motor mounted within the interior of said case and including a cylindrical core fixed to the inner circumferential surface of said case and formed with a plurality of slots in its inner circumferential surface, a stator having a coil wound through the slots of said core and a coil end extending beyond an end face of said core, and a rotor arranged radially inward of said stator and rotatably supported about a central axis in said case;

torque transmission means for transmitting output torque of said motor to drive wheels;

an oil pump for discharging oil from an oil reservoir;

drive means for rotatably driving said oil pump; and a cooling circuit for feeding oil discharged from said oil pump to said motor, said cooling circuit including:

oil feed passage means for receiving oil discharged from said oil pump; and a cooling oil ejection unit having an end portion extending parallel to said central axis and provided with an ejection face extending parallel to said central axis and an ejection port formed in said ejection face for ejecting the oil received from said oil feed passage means onto said coil end, said end portion being radially spaced from said inner circumferential surface of said case and positioned over said coil end.

5. A hydraulic circuit for an electric car drive train according to claim 4, wherein said cooling oil ejection unit has a plurality of ejection faces each formed with a plurality of ejection ports.

6. A hydraulic circuit for an electric car drive train according to claim 4, wherein said ejection face slopes downward from said ejection port and is positioned above said coil end.

7. A hydraulic circuit for an electric car drive train, comprising:

a case having an inner circumferential surface;

a motor including a cylindrical core fixed to the inner circumferential surface of said case and having an internal surface formed with a plurality of slots, a stator having a coil wound in the slots of said core and extending beyond axially spaced end faces of said core to form first and second coil ends, and a rotor arranged radially inward of said stator and rotatably supported in said case;

torque transmission means for transmitting output torque of said motor to drive wheels;

an oil pump for discharging oil from an oil reservoir;

drive means for rotatably driving said oil pump; and a cooling circuit for receiving oil discharged from said oil pump and delivering oil to said motor, said cooling circuit including:

first and second cooling oil ejection units arranged, respectively, over said first and second coil ends, each of said cooling oil ejection units having a plurality of first oil passages, each first oil passage providing oil communication to at least one ejection port for ejecting oil onto one of said coil ends, and a second oil passage connecting said first oil passages;

a third oil passage connecting the second oil passage of said first cooling oil ejection unit and the second oil passage of said second cooling oil ejection unit; and an oil feed passage connected to one of the first oil passages of said first cooling oil ejection unit for feeding the oil discharged from said oil pump.

8. A hydraulic circuit for an electric car drive train, comprising:

a case having an inner circumferential surface;

a motor including a cylindrical core fixed to the inner circumferential surface of said case and formed with a plurality of slots in its inner circumferential surface, a stator having a coil wound on the slots of said core with first and second coil ends extending axially beyond axially spaced end faces of said core, and a rotor arranged radially inward of said stator and rotatably supported in said case;

torque transmission means for transmitting the output torque of said motor to drive wheels;

an oil pump for discharging oil from an oil reservoir;

drive means for rotatably driving said oil pump; and a cooling circuit for feeding oil discharged from said oil pump to said motor, said cooling circuit including:

first and second cooling oil ejection units arranged, respectively, over said first and second coil ends, each of said cooling oil ejection units having a plurality of first oil passages, each of said first oil passages providing oil communication with at least one ejection port for ejecting oil onto one of said coil ends;

said second cooling oil ejection unit having a second oil passage connecting its first oil passages;

a plurality of third oil passages connecting one of the first oil passages of said first cooling oil ejection unit and the second oil passage of said second cooling oil ejection unit; and an oil feed passage connecting one of the first oil passages of said first cooling oil ejection unit to the oil discharge from said oil pump.

9. A hydraulic circuit for an electric car drive train, comprising:

a case having an inner circumferential surface;

a motor including a cylindrical core fixed to the inner circumferential surface of said case and formed with a plurality of slots in its inner circumferential surface, a stator having a coil wound through the slots of said core and first and second coil ends extending beyond axially spaced end faces of said core, and a rotor arranged radially inward of said stator and rotatably supported in said case;

torque transmission means for transmitting output torque of said motor to drive wheels;

an oil pump for discharging oil from an oil reservoir;

drive means for rotatably driving said oil pump; and a cooling circuit for feeding oil discharged from said oil pump to said motor, said cooling circuit including:

first and second cooling oil ejection members arranged, respectively, over said first and second coil ends, each of said ejection members having a groove formed in a face surface in contact with said inner circumferential surface of said case, said inner circumferential surface of said case covering said groove to define an oil channel for distributing oil to a plurality of oil ejection passages, each of said oil ejection passages feeding oil to at least one ejection port for ejection of oil onto one of said coil ends;

an axial oil passage formed in the wall of said case over said core and connecting the groove of said first cooling oil ejection member and the groove of said second cooling oil ejection member; and oil feed passage means for connecting one of the ejection oil passages of said first cooling oil ejection member to the discharge from said oil pump.

10. A hydraulic circuit for an electric car drive train, comprising:

a case having an inner circumferential surface;

a motor including a cylindrical core fixed to the inner circumference of said case and formed with a plurality of slots in its inner circumferential surface, a stator having a coil wound through the slots of said core and first and second coil ends extending beyond axially spaced end faces of said core, and a rotor arranged radially inward of said stator and rotatably supported in said case;

torque transmission means for transmitting the output torque of said motor to drive wheels;

an oil pump for discharging oil from an oil reservoir;

drive means for rotatably driving said oil pump; and a cooling circuit for feeding the oil discharged from said oil pump to said motor, said cooling circuit including:

a first cooling oil ejection member located above said first coil end and having a plurality of ejection oil passages, each of said ejection oil passages feeding oil to at least one ejection port for ejection of oil onto said first coil end;

a second cooling oil ejection member located above said second coil end and having a groove formed along a face contacting said case to define an oil flow channel therebetween, a plurality of oil ejection ports, and a plurality of ejection oil passages connecting said oil ejection ports with said groove;

a plurality of axial oil passages formed in the wall of said case over said core and connecting one of the ejection oil passages of said first cooling oil ejection member and the groove of said second cooling oil ejection member; and feed oil passage means for connecting one of the ejection oil passages of said first cooling oil ejection member with the oil discharge from said oil pump.

* * * * *